F. SCHULTE.
Tobacco Pipe.
No. 50,962. Patented Nov. 14, 1865.
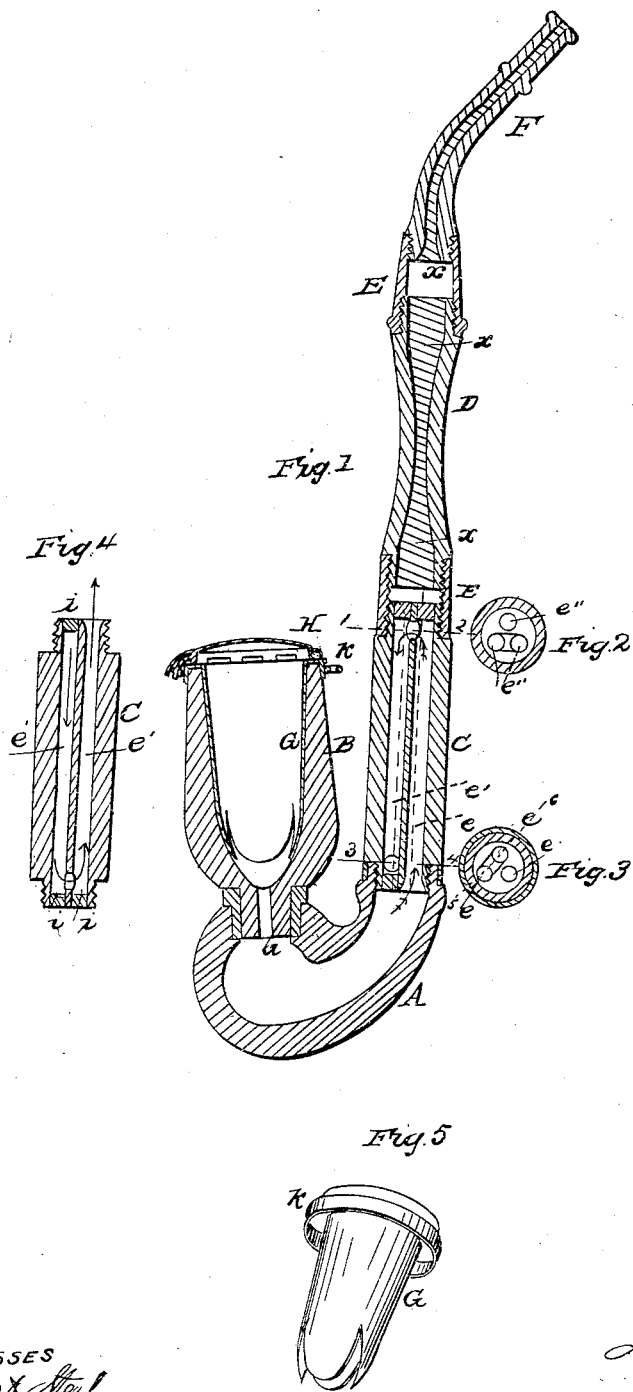
WITNESSES
Wm Albert Steel
Charles Howson
INVENTOR
F Schulte
By his Atty
Henry Howson

UNITED STATES PATENT OFFICE.

FREDERICK SCHULTE, OF PHILADELPHIA, PENNSYLVANIA.

TOBACCO-PIPE.

Specification forming part of Letters Patent No. 50,962, dated November 14, 1865.

*To all whom it may concern:*

Be it known that I, FREDERICK SCHULTE, of Philadelphia, Pennsylvania, have invented certain Improvements in Tobacco-Pipes; and I do hereby declare the following to be a full, clear, and exact description of the same, reference being had to the accompanying drawing, and to the letters of reference marked thereon.

My invention consists, first, in certain detachable corks in combination with the stem of a pipe and with certain longitudinal openings in the same, so that the latter may be readily cleansed; secondly, corrugating the interior of the stem of a pipe so that moisture from the mouth may be retained in the stem in a position to be evaporated by the passage over it of the heated smoke from the tobacco.

In order to enable others to make and use my invention, I will now proceed to describe its construction and operation.

On reference to the accompanying drawings, which form a part of this specification, Figure 1 is a sectional view of my improved tobacco-pipe; Fig. 2, a section on the line 1 2, Fig. 1; Fig. 3, a section on the line 3 4, Fig. 1; Fig. 4, a section on the line 5 6, Fig. 3, and Fig. 5 a detached perspective view.

Similar letters refer to similar parts throughout the several views.

A is a reservoir, in which are two openings, one being adapted for the reception of a hollow projection, $a$, at the lower end of the bowl B, and the other for the reception of the end of the stem of the pipe. The stem consists of two sections, C and D, which are connected by a coupling, E, a similar coupling, E', being used for connecting the mouth-piece F to the upper end of the section D. The section D is contracted in diameter at the middle, and the interior of both the section D and mouth-piece F is corrugated, for a purpose described hereinafter.

Within the section $c$ are three longitudinal openings $e$, $e'$, and $e''$, and in the upper ends of the openings $e$ and $e'$ are inserted corks $i$, and in the lower ends of the openings $e'$ and $e'$ are similar corks, $i'$, the different openings communicating with each other so that there shall be a continuous passage from the lower end of the opening $e$ to the upper end of the opening $e''$.

Within the bowl B fits a metal case, G, at the upper end of which is a flange, $k$, and to the latter is hinged the usual lid, H.

The smoke from the burning tobacco in the bowl B passes into the reservoir A, through the openings $e$, $e'$, and $e''$, through the section D and mouth-piece F, into the mouth of the smoker.

It will be apparent that by the arrangement of openings in the section C a passage equal to that in a stem three times the length of the section C is gained without any increase in the length in this stem, and that, on account of the extent of surface with which the smoke is thus brought in contact, it reaches the mouth in a much cooler condition than it would in a pipe with a shorter passage.

By removing the corks $i$ and $i'$ the openings $e$ in the sections C may be readily cleansed when they have become foul.

The greater portion of the moisture escaping from the mouth into the stem is retained within the interstices between the corrugations in the interior of the section D and the mouth-piece, the heat of the smoke as it passes to the mouth evaporating the moisture, and thus removing it from the stem.

When it is desirable to diminish the length of the stem this may be done by removing one of the sections C or D and connecting the other to the reservoir.

The use of American brier, rosewood, and other soft or gummy woods for the bowls of tobacco-pipes has heretofore been objectionable, as the heat of the burning tobacco both burns away the bowl and also causes the gummy matters in the wood to exude, rendering the bowl unpleasant to handle. By the use of the metal casing G both these objections are overcome, and the oil from the tobacco is also prevented from penetrating the pores of the wood and fouling the pipe.

If desirable, the bowl may be removed and the end of a cigar may be inserted into the opening in the reservoir adapted for the reception of the projection $a$.

I do not claim the reservoir A with its two openings adapted for the reception of the end of the stem and the bowl; but

I claim as my invention and desire to secure by Letters Patent—

1. The detachable corks or plugs $i$ and $i'$, combined with the stem of a pipe and adapted to longitudinal openings $e$, $e'$, and $e''$ in the same, substantially as described.

2. Corrugating the interior of a pipe-stem for the purpose set forth.

In testimony whereof I have signed my name to this specification in the presence of two subscribing witnesses.

FR. SCHULTE.

Witnesses:
CHARLES T. FOSTER,
JOHN WHITE.